Nov. 2, 1937.  G. E. MELOWN  2,097,527
FRUIT PICKER
Filed Jan. 8, 1937
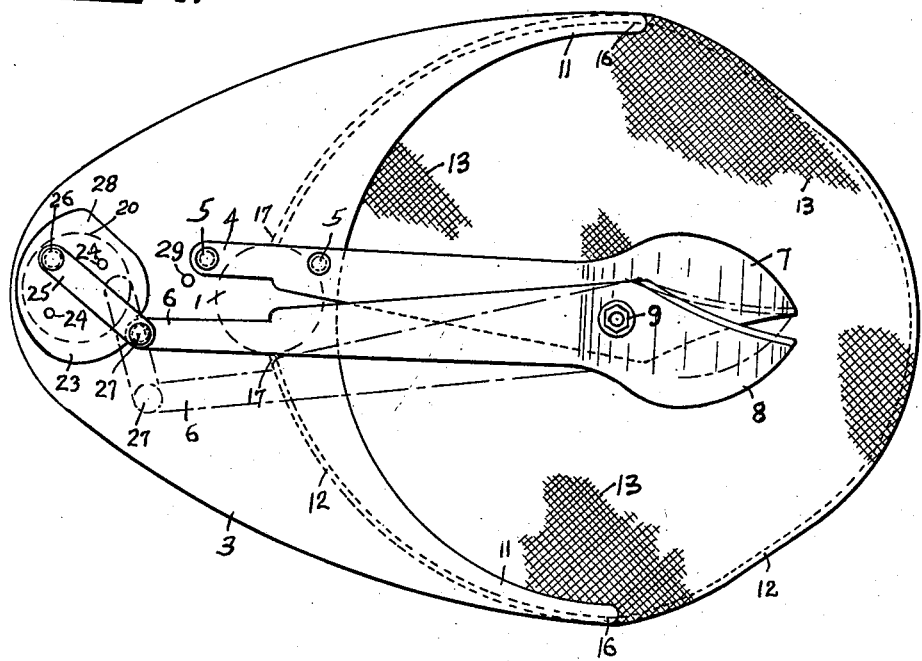
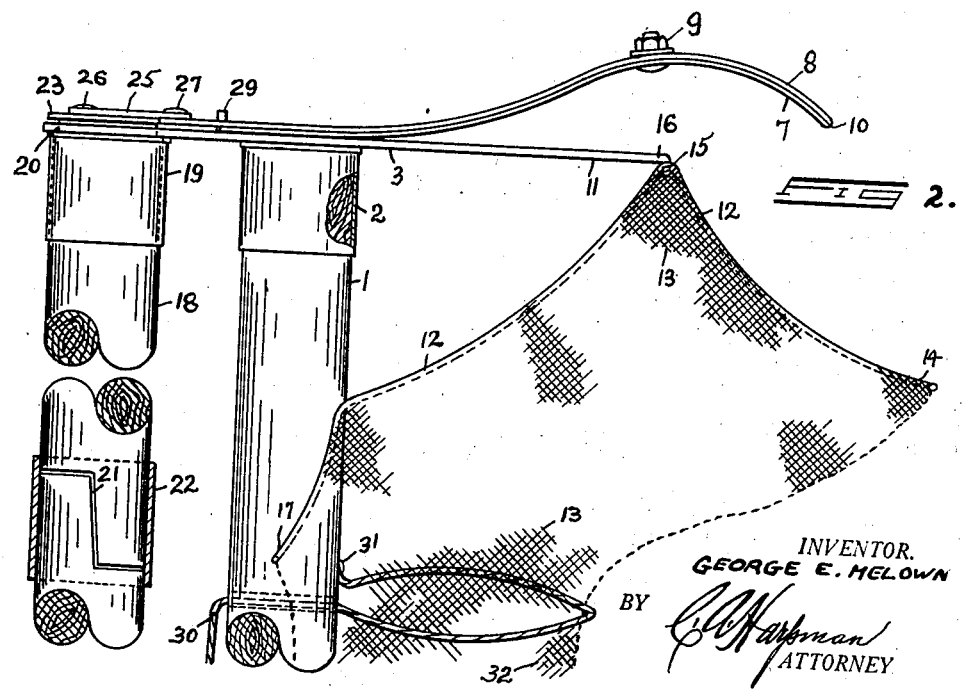
INVENTOR.
GEORGE E. MELOWN
BY
ATTORNEY Patented Nov. 2, 1937

2,097,527

UNITED STATES PATENT OFFICE 2,097,527

FRUIT PICKER

George E. Melown, Youngstown, Ohio

Application January 8, 1937, Serial No. 119,646

4 Claims. (Cl. 56—336)

This invention relates to fruit pickers.

The principal object of this invention is to provide a fruit picker suitable for picking fruit where the stem does not yield to the ordinary manner of picking by pulling the fruit from the branch. In the gathering of citrus fruit, such as grapefruit, the stem adheres to the branch so firmly that the common practice is to cut the stem.

A further object of this invention is to provide a device mounted upon a support member and having a manipulating member for the purpose of operating a pair of shears mounted on the top of the device.

A further object is to provide a stop means when the shears have been completely closed.

A further object is to provide a net into which the fruit falls when sheared from the branch.

A further object is to provide a frame for said net providing for means of observing the shears when in position for cutting the fruit stem.

A further object is to provide a curved shear head in order that the shears may be easily placed in position for shearing the stem of fruit.

A still further object is to provide a control cord for closing the neck of the net receptacle in order to prevent a cluster of fruit from entering a receiving bag.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a top plan view of the device showing the shears in a partly open position, and showing a closed position in dotted line.

Figure 2 is a side elevation of the device showing the head portion of the picker.

By referring to the drawing it will be seen that there is provided a support member 1 provided with an upper metal cap 2. A frame member 3 is secured to this metal cap 2. A pair of shears is mounted upon the upper surface of this frame member 3, said shears comprising a shear arm 4 rigidly connected to the frame member 3 by means of rivets 5, and a manipulating arm 6. By referring to Figure 2 it will be seen that the shear blades 7 and 8 are pivoted by means of a bolt 9.

It will also be seen that the shear blades 7 and 8 are upwardly and downwardly curved and have their extreme outer ends 10 pointed downwardly. The frame member 3 is provided with outwardly extended curved support arms 11 which are spaced apart, and which are for the purpose of supporting a metal frame 12 to which is attached a net receptacle 13. This metal frame 12 is formed with an outwardly extended lip member 14 and has its principal opening underneath the shear blades 7 and 8. It will be seen that the rear portion of the frame member 12 extends downwardly from suspension hooks 15 at the extreme ends 16 of the support arms 11, in order that the operator may have clear vision of the shear blades 7 and 8 when placing in a cutting position. By referring to Figure 1 it will be seen that the metal frame 12, carrying the net receptacle 13, is spaced apart, having the ends 17 secured to the opposite sides of the support member 1.

The person operating the device holds an extended lower end of the support member 1 with one hand, and a lower extended end of a manipulating member 18 with the other hand. By referring to Figure 2 it will be seen that the upper end of the manipulating member is provided with a metal cap 19 which is extended upwardly through an opening 20 formed in the frame member 3. It will also be seen that the manipulating member 18 is provided with a suitable joint 21.

In reference to the manipulating member 18 it is important that the joint 21 shall be non-rotatable, and reinforced by means of a metal sleeve 22.

By referring to Figure 1 it will be seen that a plate 23 is secured to the extreme upper end of the manipulating member 18 by means of lugs 24. It will also be seen that there is a link member 25, one end of which is pivoted to the plate 23 relatively near its outer circumference, by means of a pivot pin 26, while the other end is pivoted by means of a pivot pin 27 to the extreme end of the shear manipulating arm 6. By partly rotating the manipulating member 18 clockwise, the shear blades 7 and 8 are closed as shown in dotted position in Figure 1. It will be seen that a stop projection 28 formed on the plate 23 will then have swung around and come in contact with a stop pin 29, preventing further movement of the shear blades. When placing the device in position for cutting fruit, the manipulating member 18 is turned anti-clockwise, bringing the blades to a partly open position as shown in Figure 1 in solid lines.

By referring to Figure 2 it will be seen that there is provided a control cord 30 secured at a point 31 on the support member 1. This control cord 30 is looped about the neck of the net receptacle 13 for the purpose of preventing more than one fruit at a time from entering into any suitable receiving bag 32. In the picking of fruit it is sometimes necessary to clip a cluster at a time, and the cord 30 prevents the cluster from entering the bag 32 until separated by the operator.

What I claim is:—

1. In a fruit picker, a support member having a frame member secured thereon, outwardly extended curved support arms on said frame member, a pair of shears supported upon said frame member, blades on said shears being curved and having their extreme outer ends pointing downwardly, means for manipulating said shears, said means comprising a manipulating member the upper end of which extends through an opening in said frame member, a plate secured to the upper end of said manipulating member, a link attached at one end near the edge of said plate and in a pivoted manner, and the other end attached to the movable arm of said shears, a metal frame held by said outwardly extended curved support arms directly underneath said pair of shears and attached at a lower portion to said support member, a net receptacle carried by said metal frame and forming into a receiving bag at its lower end, a control cord secured on said support member and looped about the neck of said net receptacle.

2. In a fruit picker, a support member having a frame member secured thereon, outwardly extended curved support arms on said frame member, a pair of shears supported upon said frame member, blades on said shears being curved and having their extreme outer ends pointing downwardly, means for manipulating said shears, said means comprising a manipulating member the upper end of which extends through an opening in said frame member, a plate secured to the upper end of said manipulating member, a link attached at one end near the edge of said plate and in a pivoted manner, and the other end attached to the movable arm of said shears, a metal frame held by said outwardly extended curved support arms directly underneath said pair of shears and attached at a lower portion to said support member, an outwardly extended lip member formed in said metal frame and the rear portion of said frame extending downwardly from the outwardly extended support arms thereby providing for clear vision of said shear blades, a net receptacle carried by said metal frame and forming into a receiving bag at its lower end, substantially as described.

3. In a fruit picker, a support member having a frame member secured thereon, outwardly extended curved support arms on said frame member, a pair of shears supported upon said frame member, blades on said shears being curved and having their extreme outer ends pointing downwardly, means for manipulating said shears, said means comprising a manipulating member the upper end of which extends through an opening in said frame member, a plate secured to the upper end of said manipulating member, a link attached at one end near the edge of said plate and in a pivoted manner, and the other end attached to the movable arm of said shears, a metal frame held by said outwardly extended curved support arms directly underneath said pair of shears and attached at a lower portion to said support member, an outwardly extended lip member formed in said metal frame and the rear portion of said frame extending downwardly from the outwardly extended support arms thereby providing for clear vision of said shear blades, a net receptacle carried by said metal frame and forming into a receiving bag at the lower end, a control cord secured on said support member and looped about the neck of said net receptacle.

4. In a fruit picker, a support member having a frame member secured thereon, outwardly extended curved support arms on said frame member, a pair of shears supported upon said frame member, means for manipulating said shears comprising a manipulating member the upper end of which extends through an opening in said frame member, a plate secured to the upper end of said manipulating member, a link attached at one end near the edge of said plate and in a pivoted manner, and the other end attached to the movable arm of said shears, a stop projection formed on said plate, and a stop pin secured to said frame member, a metal frame held by said outwardly extended curved support arms and attached at a lower portion to said support member, a net receptacle carried by said metal frame and forming into a receiving bag at the lower end, a joint in said manipulating member and said support member for extending the same, and a reinforced metal sleeve for said joint, substantially as described for the purpose set forth.

GEORGE E. MELOWN.